ical cylinder mounted on the frame. The upper piston is associated with a manually operated cam while the lower piston is fixedly connected to the upper plate. Upon operation of the cam, the helicoidal spring produces a force acting against a force generated by the four spring devices for applying pressure on the piles. An accurate adjustment within a range of light pressures on the piles is therefore enabled due to these reverse forces for thereby allowing to give to the pile resistances corresponding values. When the helicoidal spring is completely compressed, the cam can still be operated to apply relatively high pressures on the piles to vary their resistances accordingly. The load bank is particularly suitable for use in wide current range battery testers.

United States Patent [19]

Reid

[11] Patent Number: 4,613,822
[45] Date of Patent: Sep. 23, 1986

[54] VARIABLE HIGH-CURRENT ELECTRICAL LOAD BANK WITH RAPID ADJUSTMENT OVER A WIDE RANGE OF CURRENTS

[76] Inventor: Donald Reid, 4000 de Maisonneuve (Apt. 2005), Montreal (Québec), Canada, H3Z 1J9

[21] Appl. No.: 544,086

[22] Filed: Oct. 21, 1983

[51] Int. Cl.$^4$ .................... G01N 27/46; H01C 10/12
[52] U.S. Cl. .................... 324/426; 177/211; 267/172; 338/101; 338/204
[58] Field of Search ................ 324/426; 338/101, 108, 338/113, 115, 204, 328; 177/211; 267/73, 172, 173, 177

[56] References Cited

U.S. PATENT DOCUMENTS

| | | | |
|---|---|---|---|
| 1,094,121 | 4/1914 | Cheney | 338/101 |
| 1,259,206 | 3/1918 | Bliss | 338/101 |
| 1,364,687 | 1/1921 | Bentley | 338/101 |
| 1,520,865 | 12/1924 | Heyer | 324/429 |
| 2,988,720 | 6/1961 | Voorlas | 338/113 |

Primary Examiner—Stewart J. Levy
Assistant Examiner—Kevin D. O'Shea
Attorney, Agent, or Firm—Robic, Robic & Associates

[57] ABSTRACT

An adjustable electrical load bank which comprises an upper and lower horizontal, electrically conducting plates mounted parallel to each other on a frame and both electrically insulated from this frame. The lower plate is fixedly mounted on the frame while the upper plate is movably connected thereto through four spring devices. Three vertical piles of disk-shaped carbon elements are disposed between the two horizontal plates and each have an electrical resistance between their respective upper and lower ends which varies with pressure applied thereon. An upper and lower pistons separated by an helicoidal spring are disposed in a verti- 24 Claims, 4 Drawing Figures

VARIABLE HIGH-CURRENT ELECTRICAL LOAD BANK WITH RAPID ADJUSTMENT OVER A WIDE RANGE OF CURRENTS

The present invention relates to a high current adjustable electrical load of the type comprising at least one pile of elements made substantially of carbon material, which pile having an electrical resistance which varies with pressure applied on this pile through its two ends. The invention also relates to a testing device using such an adjustable high current electrical load, which device may be used for testing batteries, the alternator of a motor vehicle, and/or the starter of a motor vehicle.

Most of the known high current adjustable electrical loads of the above described type, in which the resistance of the pile or piles of carbon elements reduces with an increase of pressure applied thereon, use for adjusting the pressure applied on their piles of carbon elements a pressure applying system elements provided with a threaded screw cooperating with a nut. An operator of such a known adjustable electrical load must vary the pressure applied on the pile or piles of carbon elements by turning the screw within the nut for thereby varying the resistance in order to establish a required current through the pile or piles. This kind of adjustment is relatively long, and for an adjustment of a high current through the pile or piles of carbon elements, for example currents up to 800 amperes, it is evident that a long adjustment constitutes a serious drawback. In particular, the heat generated by the carbon elements during such an adjustment is important and contributes to reduce the life of or causing damage to the adjustable load by increasing the temperature of the carbon elements during an operation of this load due to the current flowing through the load during its adjustment.

Moreover, with the above known adjustable variable loads usable for establishing currents up to 800 amperes for a voltage of, for example, 12 volts, it is very difficult to accurately adjust light pressures on the pile or piles for adjusting the resistance of this pile or piles to establish currents, for example, less than 100 amperes. The range of current which can be accurately established through the pile or piles or carbon elements is therefore limited due to the difficulty to accurately adjust values of resistance given by light pressures applied on the pile or piles of carbon elements.

An object of the present invention is therefore to provide an adjustable electrical load of the above defined type in which the pressure applied to the pile or piles can be rapidly and accurately adjusted within a range extending from a substantially zero pressure to a relatively high pressure.

More particularly, according to the present invention, there is provided an adjustable electrical load comprising:

a frame;

first and second electrically conducting means, said first conducting means having a first surface and said second conducting means having a second surface facing said first surface, said first conducting means being fixedly mounted on said frame;

first spring means, said second conducting means being mechanically connected to the frame through these first spring means;

at least one pile of elements made substantially of carbon material, which pile being disposed between the first and second surfaces of the first and second conducting means, said at least one pile having a first and a second end facing respectively the first and second surfaces and having an electrical resistance between its first and second ends which varies with pressure applied on said at least one pile through its first and second ends, the first and second conducting means being mounted with respect to each other for applying substantially no pressure on said at least one pile during a non-operating state of the adjustable electrical load;

means associated with the second conducting means for applying pressure on said at least one pile through these second conducting means, said at least one pile being pressed between the first and second surfaces when the pressure applying means apply pressure thereon;

insulating means for preventing short-circuit between the first and second conducting means through the frame and/or the pressure applying means;

the pressure applying means comprising second spring means for producing, when these pressure applying means are operated, a force acting on said second conducting means against a force produced by the first spring means for applying pressure on said at least one pile disposed between the first and second surfaces of the first and second conducting means;

the pressure applying means also comprising means for continuing to apply pressure on said at least one pile through the second conducting means after the second spring means are inhibited or completely compressed up to a relatively high pressure;

whereby in operation an accurate adjustment within a range of light pressures, starting from a substantially zero pressure, applied on said at least one pile is enabled due to the reverse forces produced by the first and second spring means for enabling accurage adjustment of the electrical resistance of said at least one pile within a range of resistive values given by this range of light pressures, so as to enable to accurately adjust within said range of resistive values an electrical resistance of a series circuit formed by the first conducting means, said at least one pile, and the second conducting means, and whereby, in operation, the pressure applied on said at least one pile can accurately be varied within a range extending from the substantially zero pressure to the relatively high pressure so as to enable an accurate adjustment of the electrical resistance of said at least one pile within a wide range, for thereby accurately varying within this wide range the resistance of the series circuit.

According to a preferred embodiment of the present invention, the pressure applying means comprise piston means and a tubular element mounted on the frame, these piston means being positioned within the tubular element.

Preferably, the piston means include a first and a second piston and a spring disposed between the first and the second pistons.

According to another preferred embodiment of the present invention, the second conducting means comprises an electrically conducting plate, the pressure applying means comprises a metal plate fixed to one of said first and second pistons, and the insulating means comprises an insulating layer, the tubular element being mounted perpendicular to the conducting plate and the metal plate being mounted for applying pressure on said at least one pile through the conducting plate and through the insulating layer when the piston means are operated, this insulating layer being provided for electrically insulating the metal plate from the conducting plate.

Preferably, the pressure applying means also comprise a cam mounted on the tubular element and cooperating with the one of the first and second pistons for operating the piston means when this cam is operated, which cam may be provided with a lever for being manually operated.

Advantageously, the adjustable electrical load according to the present invention may comprise three piles of carbon elements which elements may be disk-shaped.

The present invention also relates to a device for testing a battery provided with a positive and a negative terminal comprising;

the above described adjustable high-current electrical load according to the present invention;

means for connecting the positive terminal of the battery with one of the first second conducting means and for connecting the negative terminal of the battery with the other of said first and second conducting means;

voltmeter means for measuring voltage across the positive and negative terminals of the battery;

ammeter means for measuring current flowing through the series circuit formed by the first conducting means, said at least one pile and the second conducting means.

The present invention may also be defined as an adjustable high current electrical load comprising:

a frame;

first and second electrically conducting means, the first conducting means having a first surface and the second conducting means having a second surface facing the first surface, the first conducting means being fixedly mounted on the frame, and the second conducting means being mounted movable with respect to the frame;

at least one pile of elements made substantially of carbon material, which pile being disposed between the first and second surfaces of the first and second conducting means, said at least one pile having a first and a second end facing respectively the first and second surfaces and having an electrical resistance between its first and second ends which varies with pressure applied on said at least one pile through its first and second ends;

means cooperating with the second conducting means for applying pressure on said at least one pile through the second conducting means, said at least one pile being pressed between the first and second surfaces when the pressure applying means apply pressure thereon;

insulating means for preventing short-circuit between the first and second conducting means through the frame and/or the pressure applying means;

the pressure applying means comprising piston means associated with said second conducting means, for applying pressure on said at least one pile through these second conducting means, and a device including lever means for operating the piston means;

whereby, in operation, a rapid adjustment of the electrical resistance of said at least one pile is enabled through operation of the lever means, so as to rapidly adjust an electrical resistance of a series circuit formed by the first conducting means, said at least one pile and the second conducting means.

The objects, advantages and other features of the present invention will become more apparent from the following non restrictive description of preferred embodiments thereof made in conjunction with the accompanying drawings in which.

Figure 1:
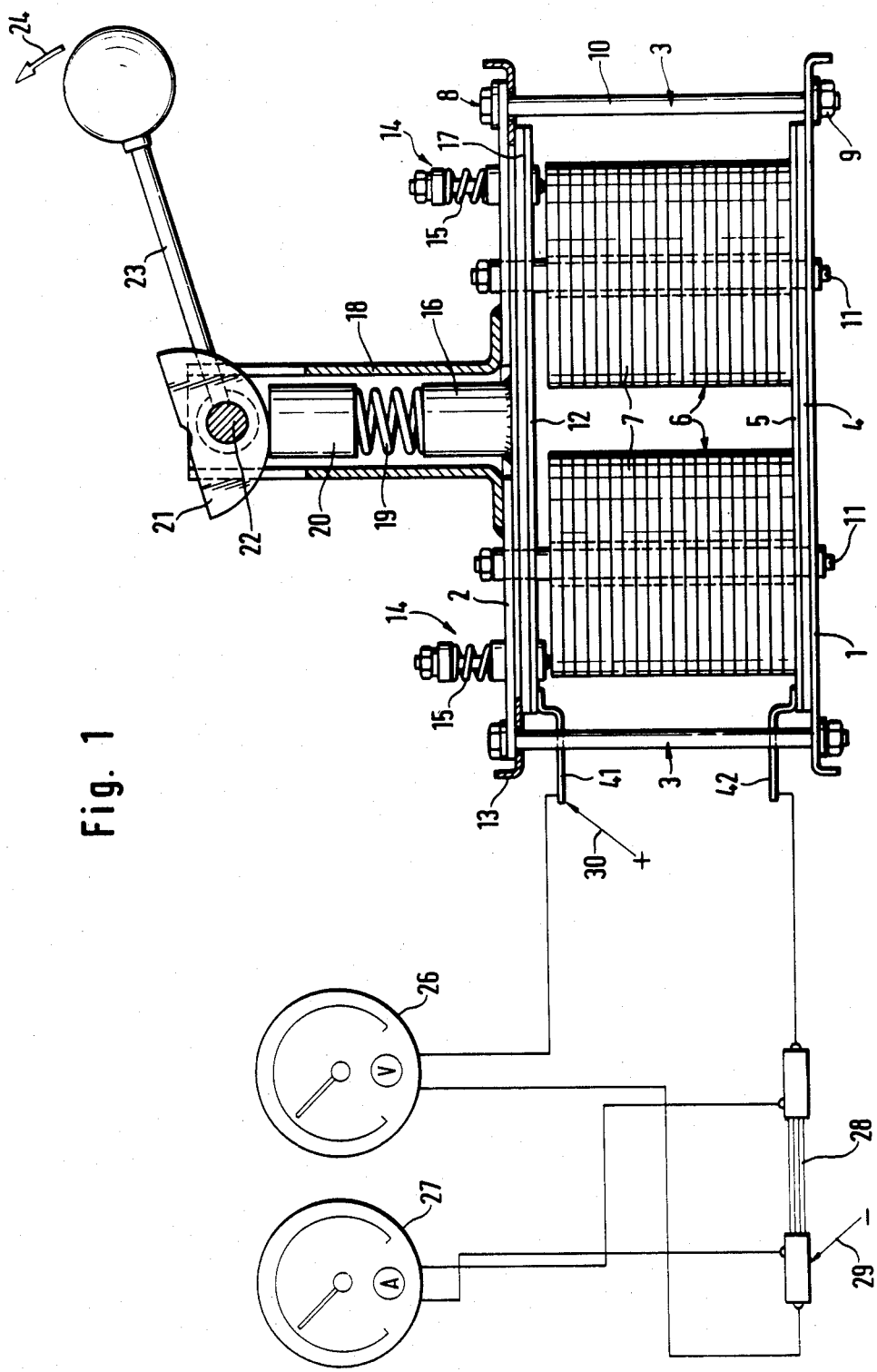
FIG. 1 represents an embodiment of the adjustable high-current electrical load according to the present invention, in which some pieces are shown in cross section, this adjustable electrical load which is manually operated comprises three piles of carbon material disk-shaped elements and is is associated with an ammeter and a voltmeter to form a battery testing device.

As shown on FIG. 1, the adjustable electrical load bank comprises a frame formed by a square lower metal plate 1 and an upper square metal plate 2, these two metal plates being mounted horizontally parallel to each other. Four mounting studs 3 are provided for fixing the plates 1 and 2 with respect to each other through the four corners of these two metal plates, respectively, with a predetermined spacing therebetween.

The two plates 1 and 2 may be made of steel or any other suitable rigid material.

In a well-known manner, each mounting stud 3 comprises a bolt 8 cooperating with a nut 9, and a tubular element 10, disposed between the plates 1 and 2 and in which is introduced the corresponding bolt 8, for mounting these plates 1 and 2, as stated above, parallel to each other and with predetermined spacing therebetween.

Mounted on the metal plate 1, there is an insulating layer 4 and an electrically conducting plate 5. This plate 5 may be made for example of copper.

Figure 2:
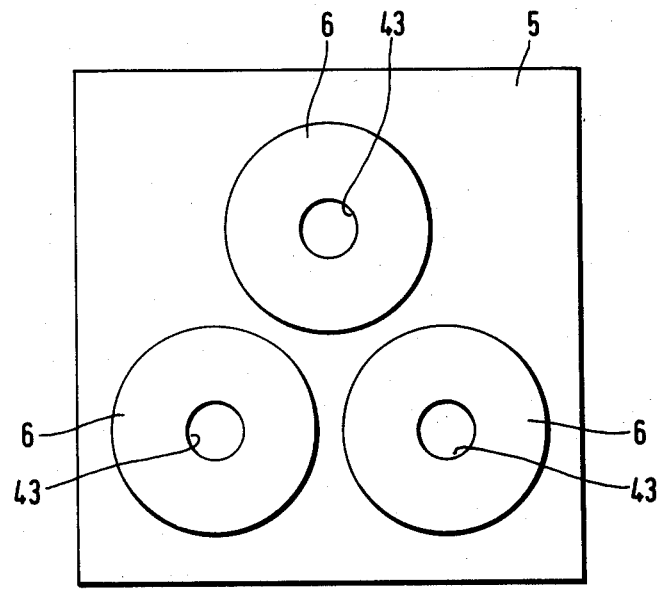
FIG. 2 shows schematically the position of the piles of disk-shaped carbon elements disposed on a lower conducting plate of the adjustable electrical load of FIG. 1.

As shown on FIGS. 1 and 2, three piles 6 each comprising twenty disk-shaped elements 7 made substantially of carbon material are disposed on the conducting plate 5, only two of which being illustrated on FIG. 1 for the purpose of simplification of the drawings.

The three piles of carbon elements are maintained in place by three insulating studs 11 each comprising elements for holding in place the three piles 6 of carbon elements 7 while insulating these piles, the lower conducting plate 5 and an upper conducting plate 12 from the metal plates 1 and 2 and from another metal plate 13, which plate 13 may also be made of steel.

Of course, each disk-shaped carbon element is provided with a central hole 43 therethrough in order to allow passage of the insulating studs through these holes for thereby holding in place the three piles 6.

As shown on FIG. 1, the four corners of the upper conducting plate 12 are mechanically connected to the four corners of the upper metal plate 2 through four devices 14 each provided with a spring 15.

Of course, these devices 14 are provided with insulating elements for electrically insulating the plate 12 from the plate 2 and therefore from the frame of the high-current adjustable electrical load.

As can be seen on FIG. 1, the metal plate 13 secured to a lower piston 16 is also mechanicaly connected to the upper conducting plate 12 through an insulating layer 17.

The insulating layers 4 and 17 are preferably made of asbestos for providing an electrically insulating property as well as a heat resistant property to these insulating layers.

The lower piston 16 is disposed within a vertical cylinder 18 along with a spring 19 and an upper piston 20. The vertical cylinder 18 is soldered on the metal plate 2 as illustrated on FIG. 1.

The upper piston 20 cooperates with an eccentric cam 21 mounted on the cylinder 18 through an axle 22. This axle 22 is provided with a lever 23 for allowing a manual operation of the cam 21.

As can be easily understood, when the lever 23 is operated as indicated by the arrow 24, the cam 21 displaces the upper piston 20 which compresses the spring 19 for applying a force on the upper conducting plate 12 through the lower piston 16, the metal plate 13 and the insulating layer 17. This force produced by the spring 19 acts against a force produced by the four springs 15 for allowing a down motion of the plates 12 and 13 and the layer 17 until the conducting layer 12 becomes in contact with the upper ends of the three piles 6 of disk-shaped carbon elements 7. Thereafter, if an operator continue to operate the lever 23 in the direction indicated by the arrow 24, due to the reverse forces produced by the spring 19 and the springs 15, an accurate adjustment within a range of light pressures starting from a substantially zero pressure is enabled as can be easily deduced in examining FIG. 1. It is to be noted that the springs 15 as well as the spring 19 are appropriately selected for this purpose.

It is well known in the art that varying the pressure applied across the piles 6 formed by disk-shaped carbon elements 7 has for effect to reduce the resistance of these piles between the lower and upper conducting plates 5 and 12, thereby allowing the flowing of a higher current through these piles for a same voltage applied across the plates 5 and 12.

As mentioned in the preamble of the present disclosure, in the conventional high-current adjustable electrical loads of the type allowing flowing of currents for example up to 800 amperes, it is difficult to accurately adjust a light pressure on the piles 6 of carbon elements 7 for establishing a desired current below 100 amperes. The structure of FIG. 1 overcomes this problem as, due to the reverse action of the springs 15 and the spring 19, a greater course of the lever 23 is necessary to slightly vary the pressure applied by the spring 19 on the pile 6 through the plates 12 and 13, the insulating layer 17 and the piston 16, thereby enabling and facilitating adjustment within a range of light pressures on the pile, and thereby enabling and facilitating adjustment of a desired electrical resistance for the piles 6 provided by such a light pressure.

Of course, after the spring 19 is inhibited or completely compressed, the cam 21 can be still operated for applying pressure on the piles 6 through the lower and upper pistons 16 and 20 for thereby permitting application of substantially high pressures to the piles 6 for increasing the range of electrical resistance of these piles 6. An accurate adjustment of the electrical resistance of the piles 6 within a very wide range is therefore enabled due to the increase of the range of pressures in which pressure applied to the piles 6 can be accurately adjusted, which range varying from a substantially zero pressure to a relatively high pressure. The range of currents through the piles 6 for a same voltage applied across these piles, for example 12 volts for motor vehicle batteries, which can be accurately adjusted, is also increased by increasing the range of accurate adjustment of the electrical resistance of the piles 6.

It is also evident that the structure of FIG. 1 allows a very fast adjustment through the lever 23 of the required resistance of the pile 6 by adjustment of the pressure applied on these piles. A desired current flowing through the piles 6 can therefore be rapidly established or adjusted before the temperature developed by this current flowing through the piles 6 becomes too high, thereby preventing damage caused to the piles 6.

Figure 3:
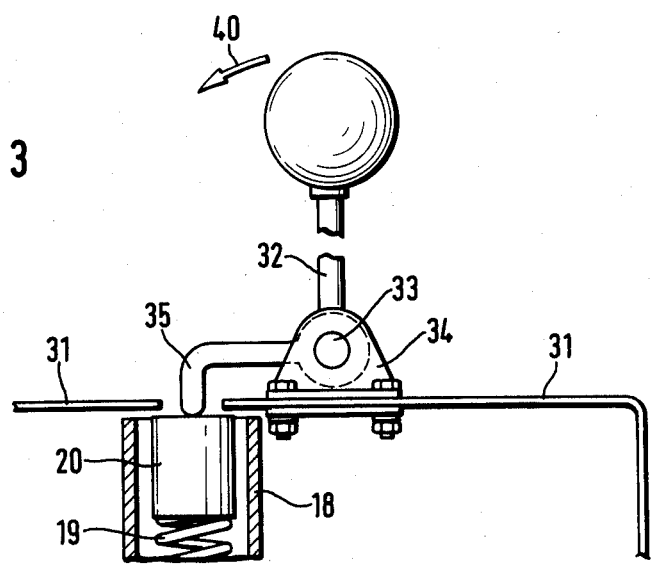
FIG. 3 shows an embodiment for a manual device usable to operate the adjustable electrical load of FIG. 1.

FIG. 3 shows another embodiment for a manual device to operate the piston means 16, 19 and 20. This embodiment comprises an arm 35 with a 90° angle and having one of its extremities fixed to an axle 33 and the other of its extremities which cooperates with the upper piston 20. The axle 33 is held by a support 34 mounted on an external casing 31 provided for the testing device of FIG. 1. A lever 32 is also secured on the axle 33 for permitting operation of the piston means 16, 19 and 20 when the lever 32 is manually displaced as shown by the arrow 40.

Referring now back to FIG. 1 of the drawings, the testing device comprises a voltmeter 26, an ammeter indicating unit 27 and an ammeter shunt 28 interconnected together and with the lower and upper conducting plates 5 and 12 through bus bars 41 and 42, as illustrated on FIG. 1. For testing a battery, the positive terminal of the battery is connected to the upper conducting plate 12 through the bus bar 41 as shown by the arrow 30 and the negative terminal of the battery is connected to the lower conducting plate 5 through the ammeter shunt 28 and the bus bar 42 as shown by the arrow 29. In order to test a battery, for example a 12 volts battery, the above described connections between the battery and the testing device of FIG. 1 are established and the lever arm 23 or 32 (FIG. 3) is operated until the required testing current delivered by the battery is adjusted through the series circuit formed by the upper conducting plate 12 the three piles 6 of carbon elements and the lower conducting plate 5 and this current is maintained for a predetermined period of time. As it is well known, by reading the voltmeter 26 and the ammeter indicating unit 27, an operator can determine if the battery is in good condition, i.e. when the battery has delivered the required testing current through the above defined series circuit during the predetermined period of time and thereafter the voltage across the positive and negative terminals of the battery indicated by the voltmeter 26 is higher than a predetermined level.

A timer may also be included in the testing device of FIG. 1 to indicate the time of testing of the battery in order to facilitate operation of this testing device.

As stated above, the resistivity of the three piles of carbon element of the load of the present invention may be varied within a wide range, and therefore the current flowing through these piles can also be varied within a wide range thereby permitting testing of a greater number of types of batteries. The current flowing through the piles 6 can be, for example, varied from 80 to 800 amperes for a 12 volts battery, thereby allowing testing of car batteries as well as heavy motor vehicle batteries designed for delivering higher currents.

Figure 4:
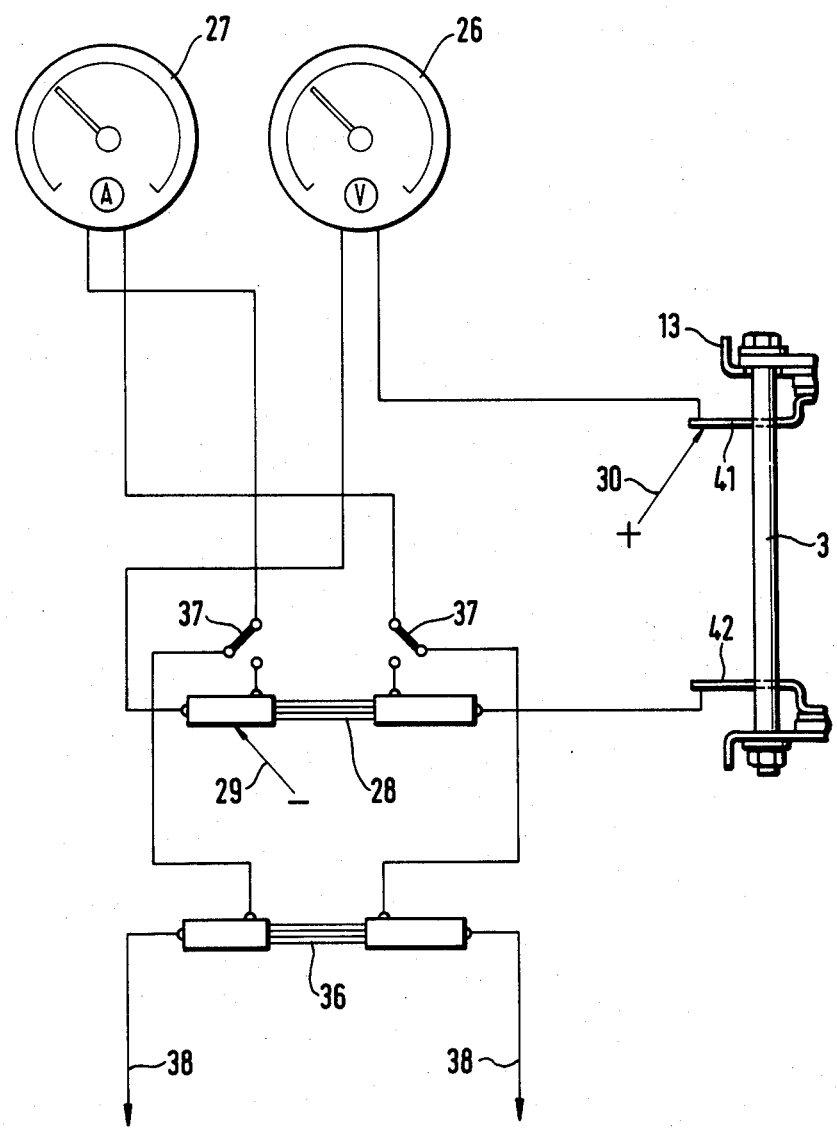
FIG. 4 illustrates the connections of an additional ammeter shunt for the battery testing device of FIG. 1 in order to extend the field of application of such a testing device.

The field of operation of the testing device of FIG. 1 can be expanded by providing as shown on FIG. 4, a second shunt 36 connectable to the indicating unit 27 by switch contacts 37. This shunt 36 is provided with wires 38 to provide external connections.

The shunt 36 can also be replaced by any current detector, such as a HALL Effect detector.

The circuit of FIG. 4, in which the shunt 36 or current detector is connected to the unit 27, can be used for example for testing the alternator of a motor vehicle by measuring the voltage and current generated by this alternator when the battery of this vehicle which is connected as indicated by the arrows 29 and 30 is loaded through the adjustable high current electrical load shown on FIGS. 1 and 2.

Another application of the testing device of FIG. 4 in which the shunt 36 or current detector is connected to the unit 27, can be testing of the starter of a motor vehicle. For this purpose, the battery is connected to the testing device as shown by the arrows 29 and 30 and the shunt 36 or the current detector detects the current supplied to the starter during operation of this one. By checking the current indicated by the ammeter indicating unit 27 and the voltage through the battery indicated by the voltmeter 26, it is possible to check if the starter is in proper condition or is worn out. Of course in this case, no load is applied to the battery through the adjustable high current electrical load.

Last of all, it should be pointed out that another advantage of the adjustable electrical load according to the invention over the known prior art adjustable loads discussed in the preamble of the present disclosure is that the action of the springs 15 (FIG. 1) opens the series circuit formed by the conducting plate 5, the piles 6 and the conducting plate 12, when the adjustable load is not operated, i.e. when the lever 23 (FIG. 1) is released. In other words, contrary to the prior art loads including screws and nuts, an operator must hold the lever 23 (FIG. 1) to keep the load on due to the springs 15 and the geometry of the cam 21, the axle 22 and the associated components.

The present invention has been hereinabove described in details by way of preferred embodiments thereof. However, it should be noted that such embodiments may be modified at will, within the scope of the appended claims, without changing or altering the spirit or nature of the present invention.

The embodiments of the invention in which an exclusive property or privilege is claimed are defined as follows:

1. An adjustable high current electrical load comprising:
    a frame;
    first and second electrically conducting means, said first conducting means having a first surface and said second conducting means having a second surface facing said first surface, said first conducting means being fixedly mounted on said frame;
    first spring means, said second conducting means being mechanically connected to said frame through said first spring means;
    at least one pile of elements made substantially of carbon material, which pile being disposed between said first and second surfaces of the first and second conducting means, said at least one pile having a first and a second end facing respectively said first and second surfaces and having an electrical resistance between its first and second ends which varies with pressure applied on said at least one pile through its first and second ends, said first and second conducting means being mounted with respect to each other for applying substantially no pressure on said at least one pile during a non-operating state of said adjustable electrical load;
    means associated with said second conducting means for applying pressure on said at least one pile through said second conducting means, said at least one pile being pressed between said first and second surfaces when said pressure applying means apply pressure thereon;
    insulating means for preventing short-circuit between the first and second conducting means through the frame and/or the pressure applying means;
    said pressure applying means comprising second spring means for producing, when said pressure applying means are operated, a force acting on said second conducting means against a force produced by the first spring means for applying pressure on said at least one pile disposed between said first and second surfaces of the first and second conducting means;
    said pressure applying means also comprising means for continuing to apply pressure on said at least one pile through the second conducting means after said second spring means are inhibited or completely compressed up to a relatively high pressure;
    whereby, in operation, an accurate adjustment within a range of light pressures, starting from a substantially zero pressure, applied on said at least one pile is enabled due to the reverse forces produced by said first and second spring means for enabling accurate adjustment of said electrical resistance of said at least one pile within a range of resistive values given by said range of light pressures, so as to enable to accurately adjust within said range of resistive values an electrical resistance of a series-circuit formed by the first conducting means, said at least one pile, and the second conducting means;
    and whereby, in operation, the pressure applied on said at least one pile can be accurately varied within a range extending from said substantially zero pressure to said relatively high pressure so as to enable an accurate adjustment of the electrical resistance of said at least one pile within a wide range, for thereby accurately varying within this wide range the electrical resistance of said series circuit.

2. The adjustable electrical load of claim 1 wherein said pressure applying means comprise piston means and a tubular element mounted on said frame, said piston means being positioned within said tubular element.

3. The adjustable electrical load of claim 2, wherein said piston means includes a first and a second pistons, and a spring disposed between said first and second pistons.

4. The adjustable electrical load of claim 3, wherein said second conducting means comprise an electrically conducting plate, said pressure applying means comprise a metal plate fixed to one of said first and second pistons, and said insulating means comprise an insulating layer, said tubular element being mounted perpendicular to the conducting plate and said metal plate being mounted for applying pressure on said at least one pile through said conducting plate and through said insulating layer when said piston means are operated, said insulating layer being provided for electrically insulating said metal plate from the conducting plate.

5. The adjustable electrical load of claim 4, wherein said insulating layer is a plate made of asbestos.

6. The adjustable electrical load of claim 2, wherein said pressure applying means comprise a cam mounted on said tubular element and cooperating with said piston means for operating these piston means when said cam is operated.

7. The adjustable electrical load of claim 3, wherein said pressure applying means comprise a cam mounted on said tubular element and cooperating with one of said first and second pistons for operating said piston means when said cam is operated.

8. The adjustable electrical load of claim 6, comprising a lever for manually operating the cam.

9. The adjustable electrical load of claim 2, comprising means cooperating with said piston means for operating said piston means.

10. The adjustable electrical load of claim 9, wherein said operating means comprise a lever for manually operating said piston means.

11. The adjustable electrical load of claim 1, wherein said first conducting means comprise an electrically conducting plate, said frame comprises a metal plate, and said insulating means comprise an insulating layer, said conducting plate being mounted on said metal plate through said insulating layer, said insulating layer being provided for electrically insulating said frame from said conducting plate.

12. The adjustable electrical load of claim 1, wherein said second conducting means comprise an electrically insulating plate, said frame comprises a metal plate, and said first spring means comprise a plurality of springs, said conducting plate being mechanically connected to said metal plate through said plurality of springs.

13. The adjustable electrical load of claim 12, wherein said metal plate and said conducting plate are substantially square and therefore each provided with four corners, each corner of said conducting plate being mechanically connected to a corresponding corner of said metal plate through at least one spring amongst said plurality of springs.

14. The adjustable electrical load of claim 1, wherein said frame comprises a first and a second metal plate, and mounting studs for fixing said first metal plate of the frame to said second metal plate of the frame, said first and second metal plates being mounted parallel to each other, with a predetermined spacing therebetween.

15. The adjustable electrical load of claim 1, wherein said carbon elements of said at least one pile are disk-shaped.

16. The adjustable electrical load of claim 15, wherein each disk-shaped carbon element is provided with a central hole, said adjustable electrical load comprising a stud for maintaining in place between said first and second surfaces said at least one pile, said stud passing through said holes of the disk-shaped elements and other holes of the first and second conducting means and being secured on said frame, said stud also comprising insulating means for electrically insulating said frame from said at least one pile and first and second conducting means.

17. The adjustable electrical load of claim 1, comprising three piles of carbon elements.

18. The electrical load of claim 1, wherein the second surface of the second conducting means is disposed separated from the second end of said at least one pile and said first surface is in contact with said first end of said at least one pile during said non-operating state, said first spring means comprising means for allowing a motion with respect to said frame of the second conducting means against said force produced by these first spring means, said second spring means comprising means for producing, when the pressure applying means are operated, said motion of the second conducting means so as the second end of said at least one pile becomes in contact with said second surface of the second conducting means for thereafter applying pressure on said at least one pile.

19. A device for testing a battery provided with a positive and a negative terminal, comprising:
an adjustable electrical load according to claim 1;
means for connecting the positive terminal of the battery with one of said first and second conducting means and for connecting the negative terminal of said battery with the other of said first and second conducting means;
voltmeter means for measuring voltages across the positive and negative terminals of the battery; and
ammeter means for measuring current flowing through said series circuit formed by the first conducting means, said at least one pile, and said second conducting means.

20. The testing device of claim 19, wherein said ammeter means comprise first current detecting means, the negative terminal of said battery being connected to said other conducting means through said first current detecting means.

21. The testing device of claim 20, wherein said first current detecting means comprise a shunt.

22. The testing device of claim 20 wherein said ammeter means comprise second current detecting means, said second current detecting means being provided with external connection means for detecting currents such as a current delivered by an alternator of a motor vehicle, or a current supplied to a starter of a motor vehicle, in order to extend a field of application of said testing device.

23. The testing device of claim 22, wherein said ammeter means comprise an indication unit and switching means for connecting said first current detecting means to said indication unit and for disconnecting said second current detecting means from the indication unit, or for connecting said second current detecting means to the indication unit and for disconnecting said first current detecting means from the indication unit.

24. The adjustable electrical load of claim 1, comprising means for opening said series circuit during said non operating state of said adjustable electrical load.

* * * * *